United States Patent
Teng et al.

(10) Patent No.: US 9,140,344 B2
(45) Date of Patent: Sep. 22, 2015

(54) DIFFERENTIAL-VELOCITY DRIVING DEVICE AND MECHANICAL ARM TO WHICH THE DIFFERENTIAL-VELOCITY DRIVING DEVICE IS APPLIED

(71) Applicant: Industrial Technology Research Institute, Hsinchu (TW)

(72) Inventors: Ming-Chang Teng, Hsinchu (TW); Yi-Jeng Tsai, Hsinchu (TW); Chin-Chi Hsiao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 207 days.

(21) Appl. No.: 13/777,328

(22) Filed: Feb. 26, 2013

(65) Prior Publication Data
US 2013/0167673 A1 Jul. 4, 2013

Related U.S. Application Data

(63) Continuation-in-part of application No. 13/071,094, filed on Mar. 24, 2011, now Pat. No. 8,616,088.

(30) Foreign Application Priority Data

Oct. 1, 2010 (TW) ............................... 99133578 A
Sep. 6, 2012 (TW) ............................. 101132473 A

(51) Int. Cl.
*F16H 37/06* (2006.01)
*B25J 17/00* (2006.01)
(Continued)

(52) U.S. Cl.
CPC ............. *F16H 37/0826* (2013.01); *B25J 9/102* (2013.01); *B25J 9/103* (2013.01); *B25J 17/0241* (2013.01); *Y10T 74/18784* (2015.01)

(58) Field of Classification Search
USPC ........ 74/490.05, 665 A, 665 C, 665 L, 665 M
See application file for complete search history.

(56) References Cited

U.S. PATENT DOCUMENTS 4,068,536 A * 1/1978 Stackhouse ..................... 74/417
4,502,347 A * 3/1985 Norris et al. .................... 74/417
(Continued)

FOREIGN PATENT DOCUMENTS

CN 101192783 6/2008
EP 1616672 1/2006
(Continued)

OTHER PUBLICATIONS

Yun, et al., "Design and analysis of a novel 6-DOF redundant actuated parallel robot with compliant hinges for high precision positioning", Nonlinear Dynamics, 2010, pp. 829-845.
(Continued)

*Primary Examiner* — Ha D Ho
(74) *Attorney, Agent, or Firm* — Muncy, Geissler, Olds & Lowe, P.C.

(57) ABSTRACT

A differential-velocity driving device and a mechanical arm to which the differential-velocity driving device is applied are provided. The differential-velocity driving device includes a first rotary driving element, a first transmission gear connected to the first rotary driving element, a second rotary driving element, a second transmission gear connected to the second rotary driving element, a fixing member connected to the first rotary driving element and the second rotary driving element such that the first rotary driving element does not move or rotate with respect to the second rotary driving element, a power output gear engaged with the first transmission gear and the second transmission gear, and an output shaft passing through an axle center of the power output gear and being coaxial with the axle center.

11 Claims, 6 Drawing Sheets

(51) Int. Cl.
  *F16H 37/08* (2006.01)
  *B25J 9/10* (2006.01)
  *B25J 17/02* (2006.01)

(56) References Cited

U.S. PATENT DOCUMENTS

| | | | | |
|---|---|---|---|---|
| 4,531,884 | A | * | 7/1985 | Russell .......................... 414/729 |
| 4,662,814 | A | * | 5/1987 | Suzuki et al. ................. 414/730 |
| 4,762,016 | A | | 8/1988 | Stoughton et al. |
| 5,019,755 | A | | 5/1991 | Walker |
| 6,658,962 | B1 | * | 12/2003 | Rosheim .................... 74/490.05 |
| 6,698,313 | B2 | | 3/2004 | Gaffney et al. |
| 6,871,563 | B2 | | 3/2005 | Choset et al. |
| 7,454,995 | B2 | | 11/2008 | Koyama et al. |

FOREIGN PATENT DOCUMENTS

| | | |
|---|---|---|
| KR | 20080048862 | 6/2008 |
| TW | 210639 | 8/1993 |
| TW | M364056 | 9/2009 |
| TW | 201000160 | 1/2010 |
| TW | 201020079 | 6/2010 |
| TW | 201215485 | 4/2012 |
| TW | 201226129 | 7/2012 |

OTHER PUBLICATIONS

Kim, et al., "A Serial-Type Dual Actuator Unit With Planetary Gear Train: Basic Design and Applications", IEEE/ASME Transactions on Mechatronics, vol. 15, No. 1, Feb. 2010, pp. 108-116.

Wolf, et al., "A New Variable Stiffness Design: Matching Requirements of the Next Robot Generation", IEEE International Conference on Robotics and Automation, May 19-23, 2008, pp. 1741-1746.

Park, "Safety Strategies for Human-Robot Interaction in Surgical Environment", SICE-ICASE International Joint Conference, Oct. 18-21, 2006, pp. 1769-1773.

Rezaei, et al., "An investigation on stuffness of a 3-PSP spatial parallel mechanism with flexible moving platform using invariant form", Mechanism and Machine Theory 51, 2012, pp. 195-216.

Intellectual Property Office, Ministry of Economics Affairs, R.O.C. "Office Action", Dec. 24, 2012, Taiwan.

* cited by examiner

DIFFERENTIAL-VELOCITY DRIVING DEVICE AND MECHANICAL ARM TO WHICH THE DIFFERENTIAL-VELOCITY DRIVING DEVICE IS APPLIED

CROSS-REFERENCE TO RELATED APPLICATIONS

This application is a continuation-in-part application of U.S. application Ser. No. 13/071,094 and claims priority to Taiwanese Patent Application No. 101132473, filed on Sep. 6, 2012, the disclosure of which is hereby incorporated by reference herein.

TECHNICAL FIELD

The present disclosure relates to driving devices and mechanical arms to which driving devices are applied, and more particularly, to a differential-velocity driving device and a mechanical arm to which the differential-velocity driving device is applied.

BACKGROUND

In 2010, the number of smart mobile devices worldwide has exceeded 1.35 billion units. The manufacturing processes of these electronic products require more than 90% of manual assembling. In recent years, minimum wages for labors have significantly increased, which severely erodes the gross profit of the electronic components assembly industry. In addition, with an aging population and low birth rate, most countries also face the problem of the shortage of labors. In view of these, there is an ongoing demand for automated assembly technology to facilitate the assembly of the electronic components in order to overcome the above problems and also to address the increasing complexity in the characteristics of electronic products assembly, such as compliance characteristic required by operations like polishing or deburring.

Due to the requirements of the automated assembly technology as mentioned above, a substantial increase in investment for multi-axis mechanical arms has been seen in the electronic components assembly industry. Parallel mechanical arms, since having a lighter structure and a faster speed and being combined with visual feature recognition techniques, have a competitive advantage when applied to the assembly work of electronic components. As a result, the parallel mechanical arms are often used in the "odd-form" assembly, and are gradually replacing the horizontal multi-joint mechanical arms.

The parallel mechanical arms, when operating at a high speed, still have a vibration problem that needs to be overcome. If vibration can be overcome to reduce cycle time, production efficiency will be significantly increased and the mechanical arms can be applied to various technical field. Furthermore, with the development trend of modern electronic products that are required to be compact-sized and low-profiled and electronic substrates that are required to have multi-layered designs, various kinds of connectors become more difficult to be assembled. Although assembly lines have gradually become automated, ultimately, some electronic components still require manual assembly. This is mainly because the mechanical arms still lack the compliance as the manual operations.

A dual-drive joint mechanism that achieves both position and stiffness controls has been proposed. This mechanism includes a dual driving element and a planetary gear set. Its primary driving element is a low-speed and high-torque motor used for position control and its secondary driving element is a high-speed and low-torque motor used for stiffness modulation. The primary and the secondary driving elements drive a mechanical joint in series through the planetary gear set, and in turn a mechanical arm is driven. Position control and stiffness modulation of the mechanical arm are achieved by controlling the motor speeds.

However, the above prior-art technique still has backlash issues. Furthermore, the planetary gear set has a speed reduction ratio that requires careful selections of matching driving elements. Therefore, the design of the controller becomes less flexible.

SUMMARY

The present disclosure provides a differential-velocity driving device, which includes a first rotary driving element; a first transmission gear connected to and rotationally driven by the first rotary driving element; a second rotary driving element; a second transmission gear connected to and rotationally driven by the second rotary driving element, the second transmission gear having the same number of teeth as the first transmission gear and; a fixing member connected with the first rotary driving element and the second rotary driving element such that the first rotary driving element does not move or rotate with respect to the second rotary driving element; a power output gear engaged with the first transmission gear and the second transmission gear; and an output shaft passing through an axle center of the power output gear and being coaxial with the axle center.

The present disclosure further provides a mechanical arm, which includes a base platform; at least one differential-velocity driving device, including a first rotary driving element, a first transmission gear connected to and rotationally driven by the first rotary driving element, a second rotary driving element, a second transmission gear connected to and rotationally driven by the second rotary driving element, the second transmission gear having the same number of teeth as the first transmission gear, a fixing member connected to the first rotary driving element and the second rotary driving element such that the first rotary driving element does not move or rotate with respect to the second rotary driving element, wherein the fixing member fixes the differential-velocity driving device to the base platform (or base), a power output gear engaged with the first transmission gear and the second transmission gear, an output shaft passing through an axle center of the power output gear and being coaxial with the axle center, a limiter provided on the output shaft and connected to at least two points of the output shaft, the at least two points being located on an inner side and an outer side of the power output gear, respectively, wherein the limiter prevents the power output gear from being detached from the first transmission gear and the second transmission gear and prevents the output shaft from being detached from the power output gear, a swing arm with one end connected to the limiter, and a rod with one end pivotally connected to the other end of the swing arm; and a moving platform pivotally connected to the other end of the rod of the differential-velocity driving device.

BRIEF DESCRIPTION OF DRAWINGS

The present disclosure can be more fully understood by reading the following detailed description of the preferred embodiments, with reference made to the accompanying drawings, wherein:

FIGS. 1A and 1B are perspective views of a differential-velocity driving device in accordance with the present disclosure, wherein FIG. 1B shows a state of subsequent actions after the state shown in FIG. 1A, FIGS. 2A to 2C are schematic diagrams depicting a mechanical arm to which the differential-velocity driving device is applied according to the present disclosure, wherein FIG. 2B is an exploded view of a portion of components in FIG. 2A, and FIG. 2C is a plan view of a portion of components in FIG. 2B.

DETAILED DESCRIPTION

Figure 1A:
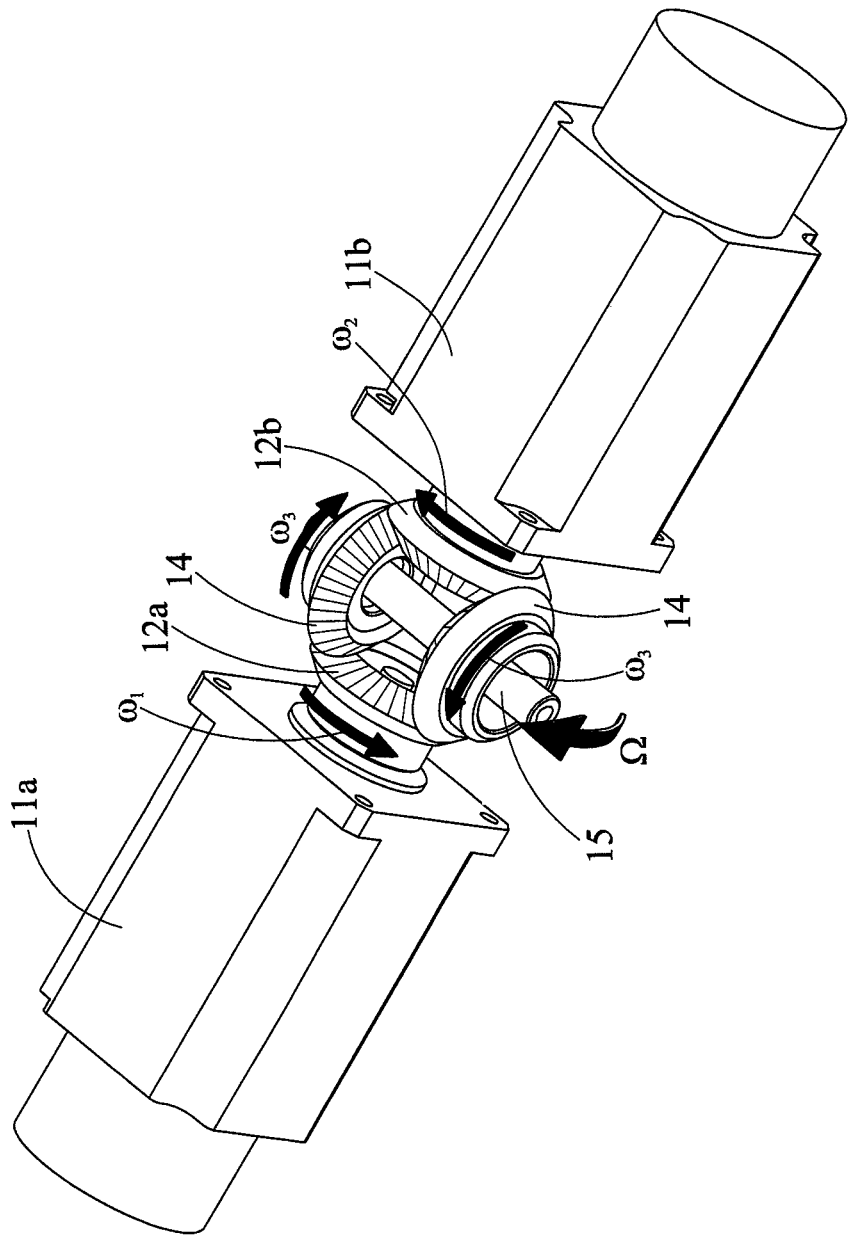

In the following detailed description, for purposes of explanation, numerous specific details are set forth in order to provide a through understanding of the disclosed embodiments. It will be apparent, however, that one or more embodiments may be practiced without these specific details. In other instances, well-known structures and devices are schematically shown in order to simplify the drawing.

Figure 1B:
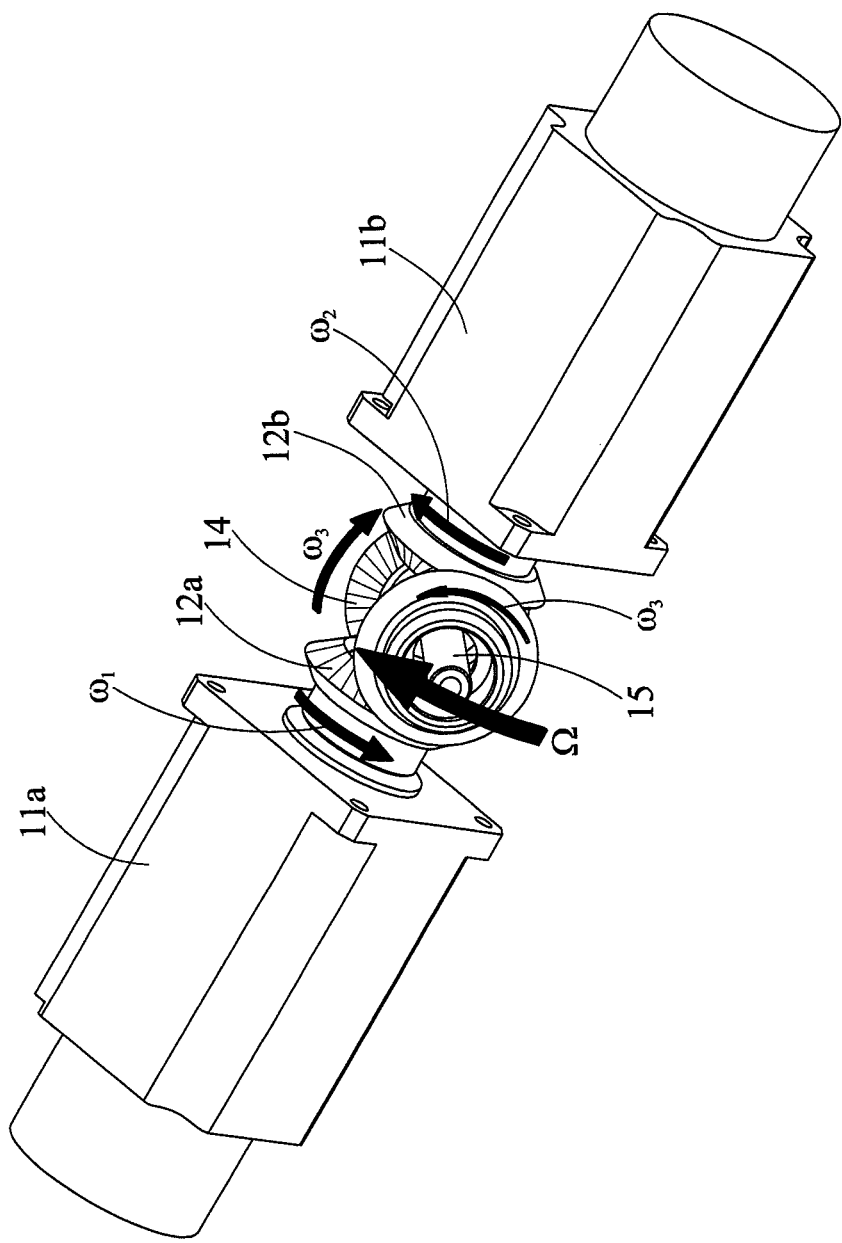

FIGS. 1A and 1B are perspective views of a differential-velocity driving device in accordance with the present disclosure, wherein FIG. 1B shows a state of subsequent actions after the state shown in FIG. 1A.

The differential-velocity driving device includes a first rotary driving element 11a; a first transmission gear 12a connected to the first rotary driving element 11a and rotationally driven by the first rotary driving element 11a; a second rotary driving element 11b; a second transmission gear 12b connected to the second rotary driving element 11b and rotationally driven by the second rotary driving element 11b; a fixing member 13 (shown in the FIGS. 2A and 2B) connected with the first rotary driving element 11a and the second rotary driving element 11b such that the first rotary driving element 11a does not move or rotate with respect to the second rotary driving element 11b; power output gears 14 engaged with the first transmission gear 12a and the second transmission gear 12b; and an output shaft 15 passing through an axle center of the power output gears 14 and being coaxial with the axle center.

Figure 2A:
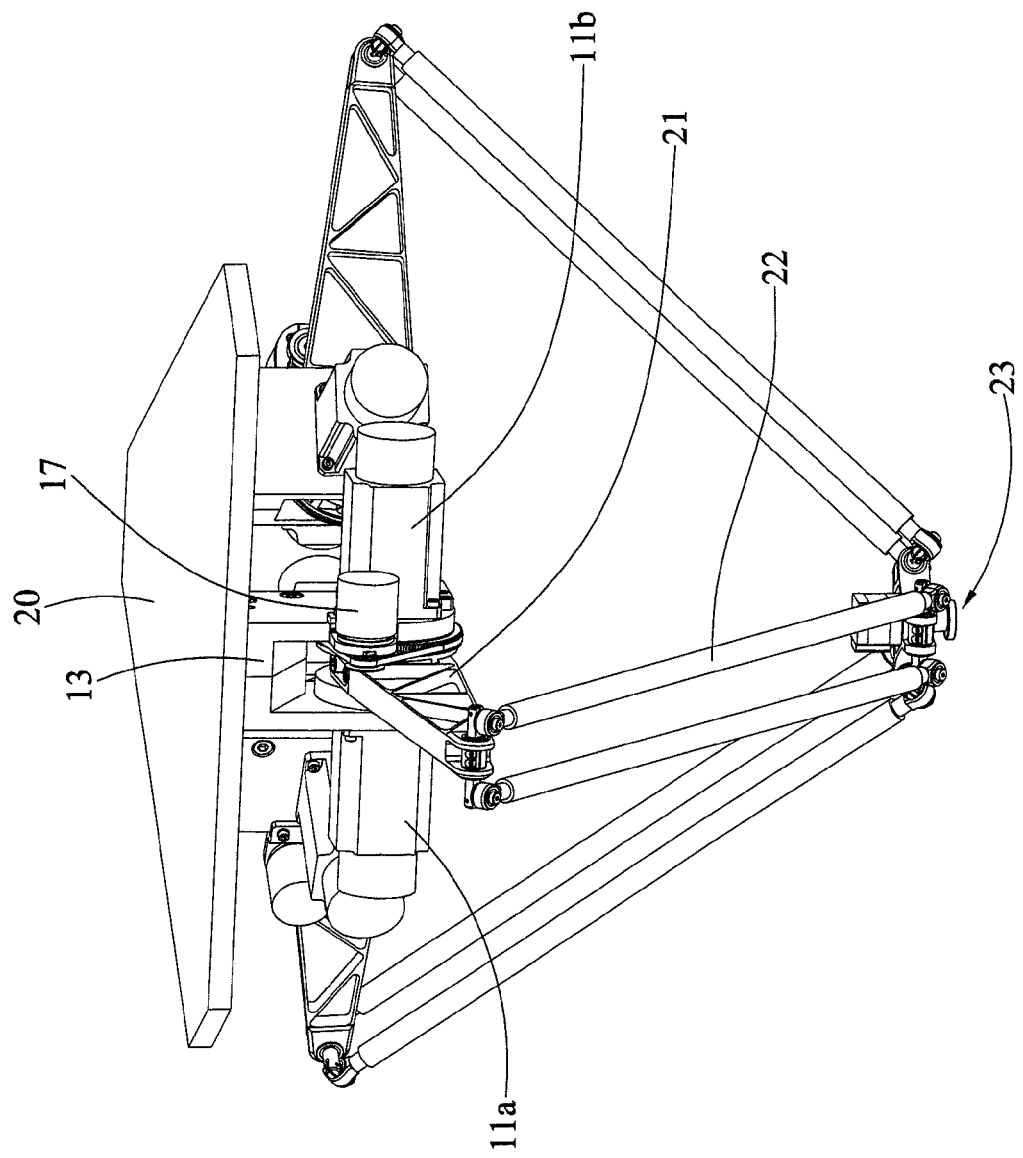
Figure 2B:
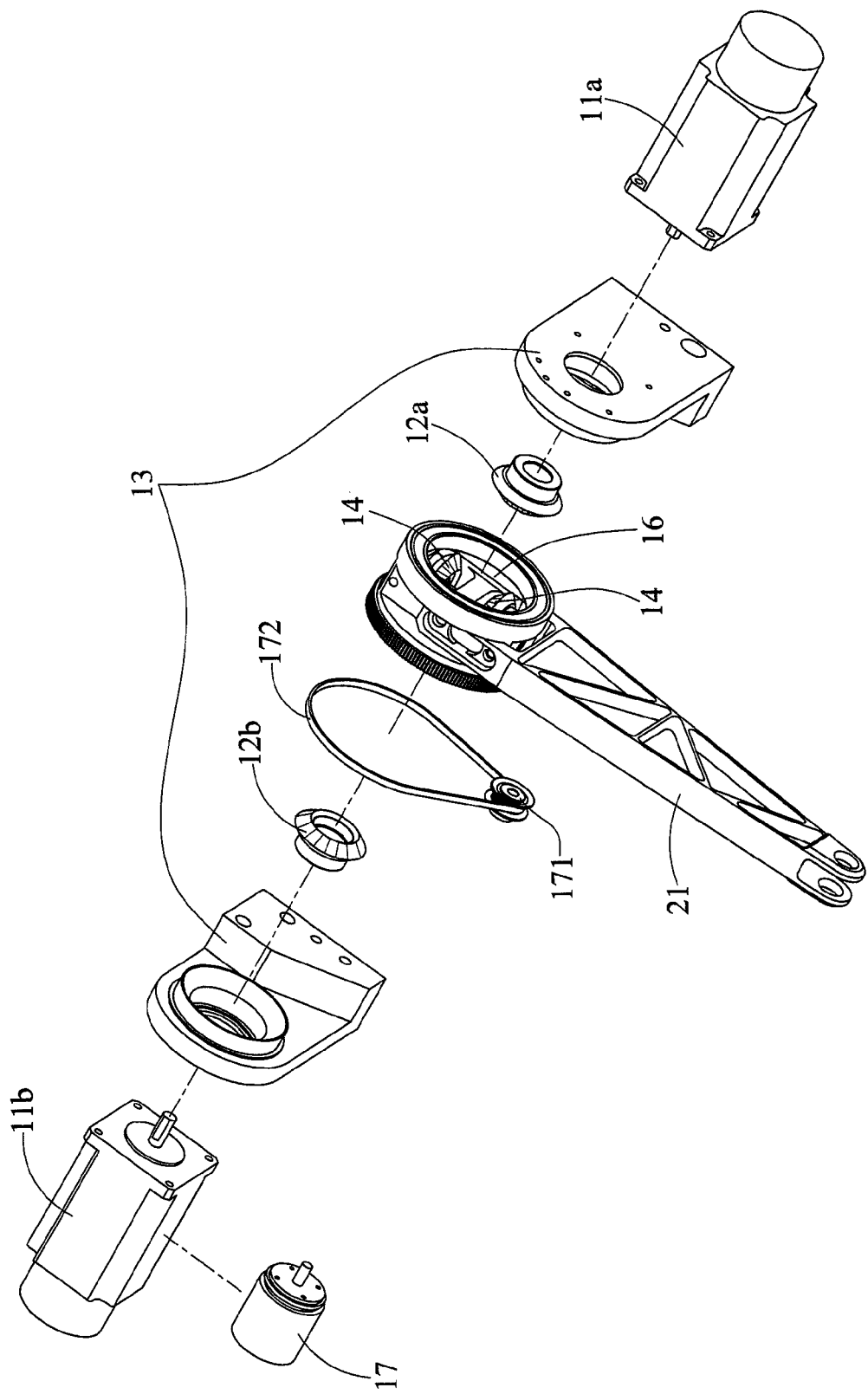
Figure 2C:
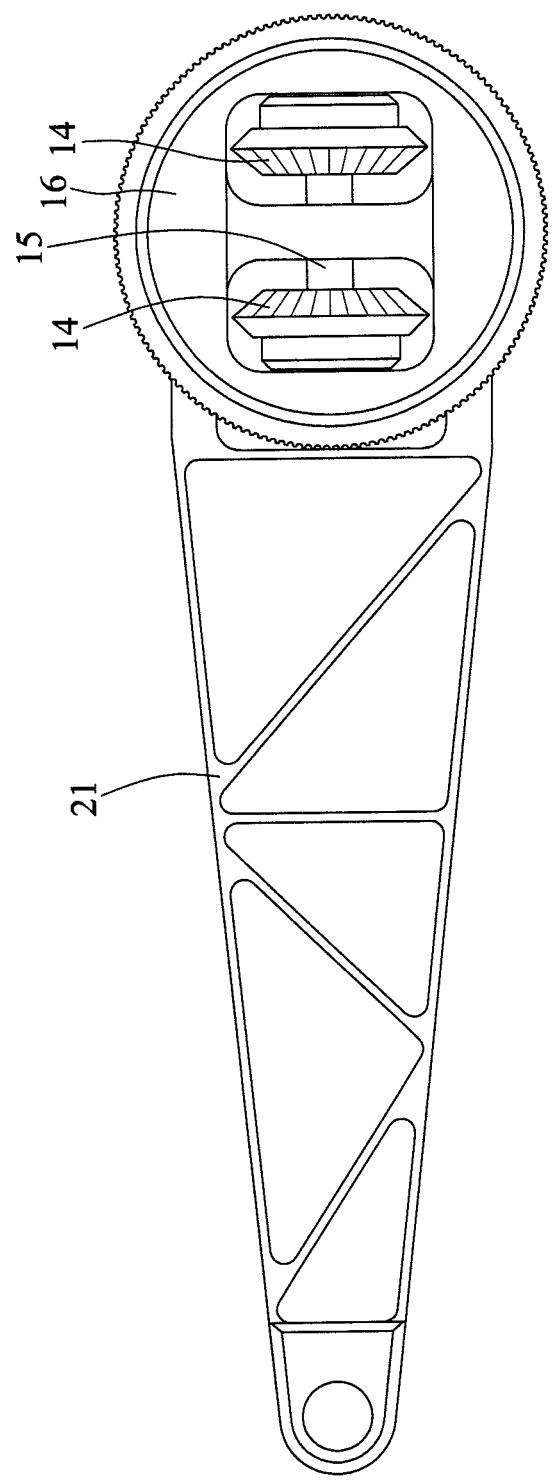

In an embodiment, the differential-velocity driving device further comprises a limiter 16 (shown in FIGS. 2B to 2C). The limiter 16 is provided on the output shaft 15 and connected to at least two points of the output shaft 15. The at least two points of the output shaft 15 are located on an inner side and an outer side of the power output gears 14, respectively. The limiter 16 is used to prevent the power output gears 14 from being detached from the first transmission gear 12a and the second transmission gear 12b and to prevent the output shaft 15 from being detached from the power output gears 14.

In an embodiment, the differential-velocity driving device further includes an angle sensor 17 having a pulley 171 (shown in FIGS. 2B and 2C) provided on the second rotary driving element 11b. The limiter 16 has a circular periphery, and the pulley 171 rotates in tandem with the circular periphery of the limiter 16 through a belt 172. The angle sensor 17 is used for measuring a rotation angle of the limiter 16, and in turn obtaining the rotation angle of the output shaft 15.

In an embodiment, the first transmission gear 12a, the second transmission gear 12b, and the power output gears 14 of the differential-velocity driving device are bevel gears or friction wheels. The first transmission gear 12a and the second transmission gear 12b have the same number of teeth, and the first transmission gear 12a and the power output gears 14 may have the same or different numbers of teeth.

Figure 1C:
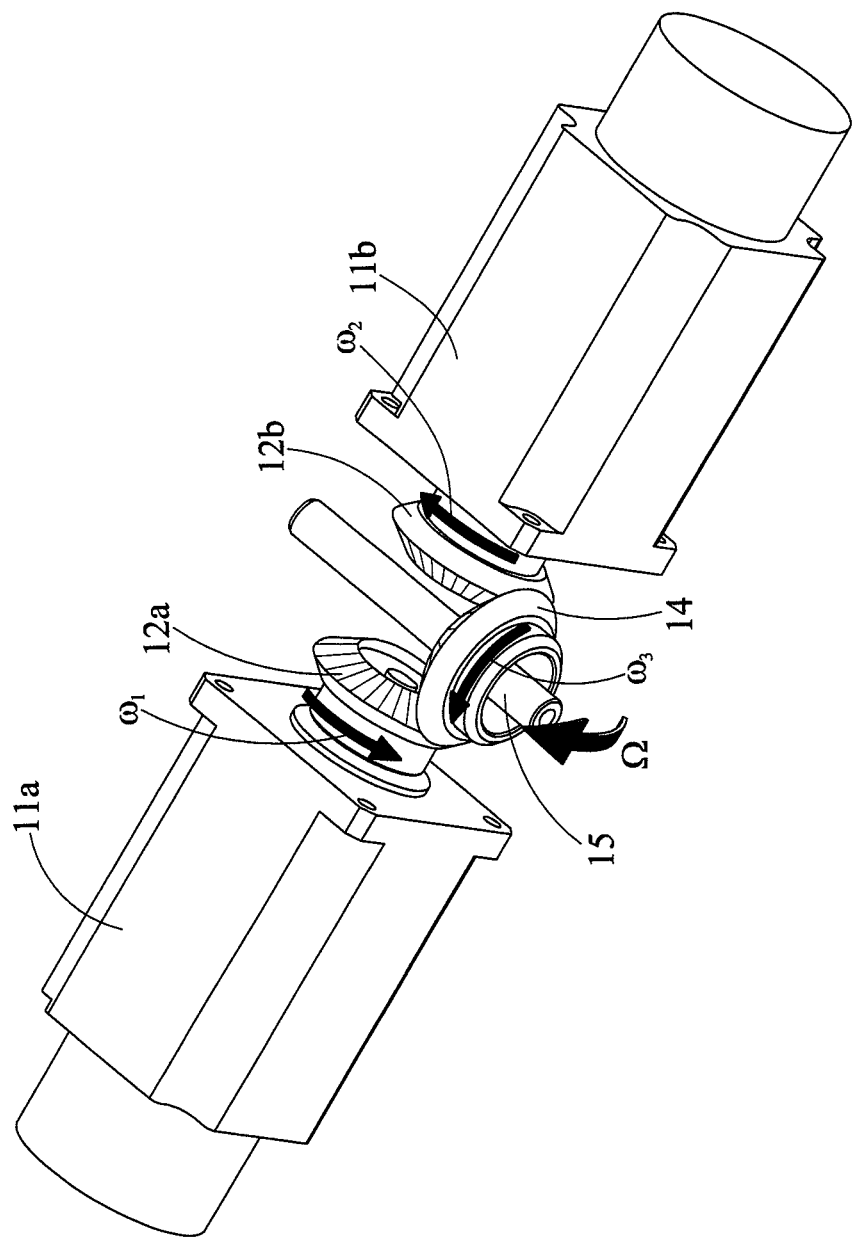
FIG. 1C is another embodiment of FIG. 1A.

It should be noted that although two power output gears 14 are shown in FIGS. 1A and 1B, a differential-velocity driving device according to the present disclosure can comprise any number of power output gears 14. For example, a differential-velocity driving device according to the present disclosure can comprise a single power output gear 14, as shown in FIG. 1C.

Referring to arrows indicating rotational directions in FIGS. 1A and 1B, it is assumed that the first transmission gear 12a and the second transmission gear 12b have a rotation speed $\omega_1$ and a rotation speed $\omega_2$, respectively. The power output gear 14 is driven to have a rotation speed $\omega_3$, and the output shaft 15 will be driven by power output gear 14 to have a rotation speed $\Omega$. The relationships between the rotation speeds $\omega_1$, $\omega_2$, $\omega_3$ and $\Omega$ are as follows.

$$\omega_3 = (\omega_2 + \omega_1)/2$$

$$\Omega = (\omega_2 - \omega_1)/2$$

FIGS. 2A to 2C are schematic diagrams depicting a mechanical arm to which the differential-velocity driving device is applied according to the present disclosure, wherein FIG. 2B is an exploded view of a portion of components in FIG. 2A, and FIG. 2C is a plan view of a portion of components in FIG. 2B.

Referring to FIGS. 1A, 1B and 2A to 2C, the present disclosure further uses the differential-velocity driving device to achieve a mechanical arm. The mechanical arm includes a base platform 20, a moving platform 23 and at least one differential-velocity driving device. The assembly of each of the differential-velocity driving devices herein further includes a swing arm 21 and a rod 22. Each differential-velocity driving device is pivotally connected to the moving platform 23 through the swing arm 21 and the rod 22. Each differential-velocity driving device includes the first rotary driving element 11a; the first transmission gear 12a connected to the first rotary driving element 11a and rotationally driven by the first rotary driving element 11a; the second rotary driving element 11b; the second transmission gear 12b connected to the second rotary driving element 11b and rotationally driven by the second rotary driving element 11b; the fixing member 13 connected with the first rotary driving element 11a and the second rotary driving element 11b such that the first rotary driving element 11a does not move or rotate with respect to the second rotary driving element 11b, the fixing member 13 fixing the differential-velocity driving device to the base platform 20; the power output gears 14 engaged with the first transmission gear 12a and the second transmission gear 12b; the output shaft 15 passing through an axle center of the power output gears 14 and being coaxial with the axle center; the limiter 16 provided on the output shaft 15 and connected to at least two points of the output shaft 15, the at least two points being located on an inner side and an outer side of the power output gears 14, respectively, the limiter 16 preventing the power output gears 14 from being detached from the first transmission gear 12a and the second transmission gear 12b and preventing the output shaft 15 from being detached from the power output gears 14, wherein one end of the swing arm 21 is connected to the limiter 16, and the other end of the swing arm 21 is connected to one end of the rod 22, and the moving platform 23 is pivotally connected to the other end of the rod 22 of each differential-velocity driving device.

The mechanical arm may further include the angle sensor 17 having the pulley 171 provided on the second rotary driving element 11b. The limiter 16 has a circular periphery, and the pulley 171 rotates in tandem with the circular periphery of the limiter 16 through the belt 172. The angle sensor 17 is used for measuring the rotation angle of the limiter 16, and in turn obtaining the rotation angle of the output shaft 15.

In an embodiment, the first transmission gear 12a, the second transmission gear 12b, and the power output gears 14 of the mechanical arm are bevel gears or friction wheels. The first transmission gear 12a and the second transmission gear 12b have the same number of teeth, and the first transmission gear 12a and the power output gears 14 may have the same or different numbers of teeth.

As shown in FIG. 2A, three differential-velocity driving devices in accordance with the present disclosure make up a mechanical arm with three degrees of freedom. However, the number of differential-velocity driving devices making up a mechanical arm is not limited to a certain number. For example, one differential-velocity driving device can be used to form a mechanical arm with one degree of freedom, or four differential-velocity driving devices can be used to form a mechanical arm with four degrees of freedom. The above modifications can be understood by one with ordinary skill in the art, thus will not be further described and shown herein.

In terms of compliance, when the two rotary driving elements rotate at the same rotation speed but in opposite directions, the power output gears in the differential-velocity driving device are turning idle in the same place, and the output shaft remains stationary. At this time, if the rotation speeds of the two rotary driving elements are increased by the same amount to maintain the same rotation speed, then the output shaft is still stationary, but the stiffness of the output shaft decreases with the increase of the rotation speed. On the contrary, the stiffness of the output shaft increases with the decrease of the rotation speed. In other words, even the output shaft has the same rotation speed, the stiffness can be modulated. This is because when normally driven by a single DC motor, the rotation speed output is inversely proportional to the torque output, i.e., the stiffness of the output shaft is related to the rotation speed output, and the differential-velocity driving mechanism of the present disclosure achieves the output of one output shaft with the rotation speeds of two rotary driving elements. Thus, with the same rotation speed output, the output shaft can have different torque outputs. For example, by increasing the rotational speeds of the rotary driving elements by the same amount, the torques of the single motor and the output shaft decrease, but the rotation speed of the output shaft remains the same. In addition, when there is a difference in speed between the two rotary driving elements, the output shaft can achieve fine movements through small speed differences between the two rotary driving elements.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A differential-velocity driving device, comprising:
   a first rotary driving element;
   a first transmission gear connected to and rotationally driven by the first rotary driving element;
   a second rotary driving element;
   a second transmission gear connected to and rotationally driven by the second rotary driving element, the second transmission gear having the same number of teeth as the first transmission gear;
   a fixing member connected to the first rotary driving element and the second rotary driving element such that the first rotary driving element does not move or rotate with respect to the second rotary driving element;
   a power output gear engaged with the first transmission gear and the second transmission gear; and
   an output shaft passing through an axle center of the power output gear and being coaxial with the axle center, wherein the output shaft is free from connecting to the fixing member.

2. The differential-velocity driving device of claim 1, further comprising a limiter provided on the output shaft and connected to at least two points of the output shaft, the at least two points being located on an inner side and an outer side of the power output gear, respectively, the limiter preventing the power output gear from being detached from the first transmission gear and the second transmission gear and preventing the output shaft from being detached from the power output gear.

3. The differential-velocity driving device of claim 2, further comprising an angle sensor having a pulley for measuring a rotation angle of the limiter and provided on the second rotary driving element, wherein the limiter has a circular periphery, and the pulley rotates in tandem with the circular periphery of the limiter through a belt.

4. The differential-velocity driving device of claim 1, wherein the first transmission gear, the second transmission gear, and the power output gear are bevel gears or friction wheels.

5. The differential-velocity driving device of claim 1, wherein the first transmission gear and the power output gear have the same number of teeth.

6. The differential-velocity driving device of claim 1, wherein the first transmission gear and the power output gear have different numbers of teeth.

7. A mechanical arm, comprising:
   a base platform;
   at least one differential-velocity driving device, including:
   a first rotary driving element;
   a first transmission gear connected to and rotationally driven by the first rotary driving element;
   a second rotary driving element;
   a second transmission gear connected to and rotationally driven by the second rotary driving element, the second transmission gear having the same number of teeth as the first transmission gear;
   a fixing member connected to the first rotary driving element and the second rotary driving element such that the first rotary driving element does not move or rotate with respect to the second rotary driving element, the fixing member fixing the differential-velocity driving device to the base platform;
   a power output gear engaged with the first transmission gear and the second transmission gear;
   an output shaft passing through an axle center of the power output gear and being coaxial with the axle center;
   a limiter provided on the output shaft and connected to at least two points of the output shaft, the at least two points being located on an inner side and an outer side of the power output gear, respectively, the limiter being preventing the power output gear from being detached from the first transmission gear and the second transmission gear and preventing the output shaft from being detached from the power output gear;
   a swing arm with one end connected to the limiter; and
   a rod with one end pivotally connected to the other end of the swing arm; and
   a moving platform pivotally connected to the other end of the rod of the differential-velocity driving device.

8. The mechanical arm of claim 7, further comprising an angle sensor having a pulley for measuring a rotation angle of the limiter and provided on the second rotary driving element, wherein the limiter has a circular periphery, and the pulley rotates in tandem with the circular periphery of the limiter through a belt.

9. The mechanical arm of claim 7, wherein the first transmission gear, the second transmission gear, and the power output gear are bevel gears or friction wheels.

10. The mechanical arm of claim 7, wherein the first transmission gear and the power output gear have the same number of teeth.

11. The mechanical arm of claim 7, wherein the first transmission gear and the power output gear have different numbers of teeth.

* * * * *